United States Patent
Marsland

(10) Patent No.: US 7,223,437 B2
(45) Date of Patent: May 29, 2007

(54) PRESSURE MOLDED PROTEINACEOUS WAFERS, INGREDIENT INCLUSIONS, COOKIES, AND WAFFLE FOOD PRODUCTS; PRESSURE MOLDING PROCESS METHOD, MASS BALANCED AND VISCOSITY SPECIFIC BATTER FOR THE MANUFACTURE OF THESE FOOD PRODUCTS, AND FINAL PROTEINACEOUS FOOD PRODUCTS DERIVED UT

(75) Inventor: Charles H. Marsland, Sudbury, MA (US)

(73) Assignee: Archer Daniels Midland Company, Decatur, IL (US)

( * ) Notice: Subject to any disclaimer, the term of this patent is extended or adjusted under 35 U.S.C. 154(b) by 0 days.

(21) Appl. No.: 10/318,950

(22) Filed: Dec. 13, 2002

(65) Prior Publication Data

US 2003/0113434 A1   Jun. 19, 2003

Related U.S. Application Data

(60) Provisional application No. 60/340,236, filed on Dec. 14, 2001.

(51) Int. Cl.
*A23J 1/00* (2006.01)
(52) U.S. Cl. ............................... 426/656; 426/512
(58) Field of Classification Search ............... 426/656, 426/512
See application file for complete search history.

(56) References Cited

U.S. PATENT DOCUMENTS

| | | | | |
|---|---|---|---|---|
| 2,101,633 A | * | 12/1937 | Whitaker et al. | 426/656 |
| 2,801,173 A | * | 7/1957 | Devareaux | 426/623 |
| 3,185,574 A | * | 5/1965 | Gabby et al. | 426/549 |
| 3,431,112 A | * | 3/1969 | Durst | 426/89 |
| 3,446,623 A | * | 5/1969 | Cohan et al. | 426/311 |
| 3,814,819 A | * | 6/1974 | Morgan | 426/72 |
| 3,962,462 A | * | 6/1976 | Burkwall et al. | 426/1 |
| 4,068,007 A | * | 1/1978 | Forkner | 426/106 |
| 4,076,846 A | * | 2/1978 | Nakatsuka et al. | 426/62 |
| 4,543,262 A | * | 9/1985 | Michnowski | 426/306 |
| 4,735,808 A | * | 4/1988 | Scaglione et al. | 426/62 |
| 4,832,971 A | * | 5/1989 | Michnowski | 426/302 |
| 4,849,230 A | * | 7/1989 | Varvello | 426/27 |
| 4,859,475 A | * | 8/1989 | Michnowski | 426/72 |

\* cited by examiner

*Primary Examiner*—Anthony Weier
(74) *Attorney, Agent, or Firm*—Andrew F. Nilles

(57) ABSTRACT

Novel, edible, pressure molded proteinaceous wafer, waffle, inclusion ingredient, and cookie food products are derived utilizing an engineered batter formulation of proteinaceous materials, water, oils/fats, flavors, and select percentages of carbohydrates. The batter has a specific mass balance ratio that allows the wafers to be consistently manufactured on process equipment that was designed for carbohydrate wafer, waffle, or cookie processing. The novel engineered mass balance-based protein formulation provides a batter that can be pumped, utilizes standard steam port pressure relief systems, and results in a final food product that has marketable organoleptic qualities as a component in fabricated protein bars/snacks, confections, as an inclusion in other foods, or as an independent snack food, frozen breakfast food, cookie, or cone product.

24 Claims, No Drawings

PRESSURE MOLDED PROTEINACEOUS WAFERS, INGREDIENT INCLUSIONS, COOKIES, AND WAFFLE FOOD PRODUCTS; PRESSURE MOLDING PROCESS METHOD, MASS BALANCED AND VISCOSITY SPECIFIC BATTER FOR THE MANUFACTURE OF THESE FOOD PRODUCTS, AND FINAL PROTEINACEOUS FOOD PRODUCTS DERIVED UT

CROSS-REFERENCE TO RELATED APPLICATION

This application claims priority of Provisional patent application Ser. No. 60/340,236, filed on Dec. 14, 2001.

FIELD OF THE INVENTION

This invention relates to high-protein, molded, baked wafer-waffle-cookie food products, the batter for such food products, and methods of making such food products.

BACKGROUND OF THE INVENTION

Currently, all molded, baked, wafer-waffle-cookie food products are made from high carbohydrate/fat/lecithin/water batter formulations, processed on expensive continuous process lines, utilizing molding plate and drum technology, including but not limited to large scale commercial equipment from Hebenstreit and Franz Haas. Such specialized process equipment systems have been designed for mixing, pumping, applying (depositing), molding, baking, and processing high carbohydrate-based batters and resulting final molded food products including bars/cones/confections/inclusions/waffles/wafer cookies/pizzelles/fortune cookies. High protein batters and resulting food products cannot be easily processed on this equipment due to the fact these highly engineered standardized process systems have been designed specifically for handling high carbohydrate/water/fat/oil/lecithin batters having known properties.

SUMMARY OF THE INVENTION

The invention relates generally to a novel engineered mass balance batter formulation of proteins/carbohydrates to water with a specified viscosity range for commercially processable proteinaceous pressure molded fabricated food products including plain wafers/waffles/cookies, flavored wafers/waffles/cookies, layered wafer bars, enrobed wafer bars, flavored wafer bars, sandwich wafer snacks, proteinaceous inclusion ingredients, fabricated wafer inclusion bars/cookies/confections, crème filled wafer food products, cone products, wafer confections, and pizzelle wafer cookies, Chinese fortune cookies, and high moisture breakfast waffles.

However, the inventive engineered mass balance formulation of proteins/fat/lecithin/water/flavor systems, and carbohydrates, allows high-protein batters and resulting wafers to be processed on existing process equipment, without requiring extensive re-engineering and modification of the wafer equipment, including new wafer molding plate steam pressure release ports, batter mixing and pumping/piping systems, and batter applicator (depositing) heads.

The novel, edible, proteinaceous batter formulation is engineered for a necessary specific mass balance ratio for consistent manufacturing of the pressure molded food products on equipment designed specifically for standard high carbohydrate formulation batter processing. This inventive mass balance—viscosity controlled batter technology has been engineered to have process-related properties that are similar or identical to those of the standard high percentage carbohydrate-based batters and final food products, so that they can be processed on the equipment that is designed for such. It was discovered that the mass balance—controlled viscosity formulation ratio is crucial. Without the mass balance—viscosity ratio, a protein-based batter would significantly increase standard steam port pressure, with possible explosion ramifications; costly steam port modification of the standard process molding equipment would have to be undertaken, which would include re-engineering and manually modifying all of the wafer molding plate steam pressure release ports to specifically handle identified steam pressure requirements. In addition, the batter mix and pump systems would need to be modified to handle high batter viscosities, and plate applicator nozzles for the new batters would have to be modified for handling the high water, highly viscous batter application.

The novel technology addresses these items, for it is based on utilizing a formulation of proteinaceous materials, with select dispersant—agglomerated proteinaceous materials in conjunction with filler proteinaceous materials, or structural case hardening proteinaceous materials, and/or encapsulated proteinaceous ingredients and carbohydrates. This formulation is blended and mixed with a specific amount of water, desired sweetener/flavoring agent system, lecithin, and oil/fat, and blended thoroughly until well mixed and possessing a smooth batter-like property. The specific solids: water mass balance ratio is from 1.00:0.500 to 1.00:4.00, not including any fats or lecithin in the batter. The batter must also possess a viscosity of greater than 100 centipoise but less than 25,000 centipoise at 24° C. The specific formulation of proteinaceous material ingredients is designed to be broad, but allows for the use of combinations of whey protein isolate, modified wheat protein isolate, gluten, soy protein isolate, whey protein concentrate, textured wheat protein, instantized whey protein isolate, instantized whey protein concentrate, milk protein concentrate, milk protein isolate, instantized milk protein isolate, soy protein concentrate, instantized soy protein, hydrolized collagen, gelatin, hydrolyzed gelatin, rennet casein, acid casein, egg protein, caseinates, instantized caseinates, single cell proteins, and encapsulated and/or denatured and/or crosslinked versions of such in calculated ratios.

The formulation of proteins/carbohydrates is mixed with water to meet the engineered mass balance—viscosity requirements. It is then blended thoroughly to eliminate particle clumping. Lecithin, sweetener, flavor systems, and oil/fat are then added to the mixed batter and further blended and properly dispersed within the protein matrix. The batter is then pumped and directly applied to the molding plates or heated drum mold. The high temperature plates are then closed upon each other, sandwiching the batter or the heated drum turns. The water in the batter is converted to steam and flashed off through the steam pressure release ports. The food product is baked to desired moisture content of less then 25% but greater than 1%. The resulting final food product is a molded, structurally stable, and possessing a proteinaceous profile of greater than 25% dry weight. This molded food product is then optionally further processed into layered wafer crème bars, enrobed wafer crème bars, flavored wafer crème bars, sandwich wafer snacks, cone products, crème filled wafer products, converted into wafer inclusions for other bars/snacks/confections/foods, a wafer snack food product, a wafer cookie product (pizzelle), or a frozen breakfast waffle.

This invention features pressure molded proteinaceous wafers-cookies-waffles with greater than 25% dry weight protein composition, the pressure molding process to make such, and all resulting fabricated foods/confections/ingredients made utilizing the proteinaceous molded food items.

The proteinaceous molded foods may be made utilizing a protein blend consisting of proteinaceous ingredients, water soluble proteinaceous materials, and filler proteins, including whey protein isolate, modified wheat protein isolate, gluten, soy protein isolate, whey protein concentrate, textured wheat protein, textured vegetable protein, single cell protein, instantized whey protein isolate, instantized whey protein concentrate, milk protein concentrate, milk protein isolate, instantized milk protein isolate, soy protein concentrate, instantized soy protein, hydrolyzed collagen, gelatin, hydrolyzed gelatin, rennet casein, acid casein, egg protein, caseinates, instantized caseinates, and/fat and/or lecithin and/or wax and/or carbohydrate encapsulated versions or crosslinked or denatured versions of such. The proteinaceous ingredients may be crosslinked or bridged utilizing chemical and enzymatic crosslinking and/or bridging agents. These protein ingredients can optionally be blended with a carbohydrate including flour, starch, modified starch, soluble fiber, insoluble fiber, sugar, carbohydrate syrup, sugar alcohol, and modified flour.

The proteinaceous molded food item may be manufactured utilizing a protein/carbohydrate batter with a mass balance solids to water ratio between 1.00:0.500 to 1.00:4.00, not including the fats or lecithin included in the batter. The protein wafers may be manufactured in pressure molding systems, utilizing heated molding plates or drum, with temperatures less than 500° F. but greater than 100° F. The molded proteinaceous food item may be manufactured utilizing a protein batter with a viscosity less than about 25,000 centipoise (cP) but greater than 100 centipoise (cP), with the preferred being less than 5,000 cP but greater than 500 cP. The proteinaceous food products may be utilized to make flavored wafers, layered wafer bars, enrobed wafer bars, flavored wafer bars, sandwich wafer snacks, proteinaceous inclusion ingredients, fabricated wafer inclusion bars/cookies/candies, crème filled wafer products, wafer cone products, wafer confections, wafer cookies, and pizzelle wafer cookies, breakfast waffles, and a Chinese fortune cookie-like product.

DESCRIPTION OF THE PREFERRED EMBODIMENTS OF THE INVENTION

The following are examples of the invention:

EXAMPLE 1

A batter blend of ingredients consisting of 21% instantized (lecithin agglomerated) whey protein isolate (92% protein), 21% textured wheat protein (72% protein), 3% lecithin, 1% rice bran oil, 0.2% Sucralose (artificial sweetener), 0.1% vanillin, and 55% water were blended in a high speed homogenizing mixer until thoroughly liquefied into a batter-like consistency. The protein batter product was then directly applied to a preheated (310° F.) Heibenstreit stainless steel molded wafer plate. The plates were closed and locked in place, applying direct heat to the 2 mm batter sheet. Steam released through the vents and the product was cooked, under pressure, for 2.0 minutes. Final protein wafer was durable and low moisture (~2% moisture).

The solids to water mass balance of the batter is 1.00:1.25 and the viscosity of the batter (no added emulsifying agents, fats, sweeteners) was 1933 cP (+/−12% torque) @ 23.1° C. as run on a Brookfield DV-II+ Viscometer.

Final chemical composition of the pressure molded protein wafer was 78% protein, 5% fat, and ~9% carbohydrate.

EXAMPLE 2

A batter blend of ingredients consisting of 99 lbs (26%) instantized (lecithin agglomerated) whey protein isolate (@ 92% protein), 40 lbs (10.5%) textured wheat protein (@ 72% protein), 40 lbs wheat flour, 3% lecithin, 1% rice bran oil, 0.2% Sucralose (artificial sweetener), 0.1% vanillin, and 200 lbs (53%) water were blended in a high speed square vessel mixer until thoroughly liquefied/blended into a batter-like consistency. The proteinaceous batter was then pumped through an overhead stainless steel 2 inch pipe system to the wafer machine and wand applied to preheated (~210° F.) Haas stainless steel molded wafer plates. The plates were closed and locked in place, applying direct heat to the 2 mm batter sheet. Steam released through the vents and the product was cooked, under pressure, for 2.0 minutes. Final protein wafer was durable and low moisture (~2% moisture).

The solids to water mass balance of the batter is 1.00:1.12 and the viscosity of the batter (no added emulsifying agents, fats, sweeteners) was 1600 cP (+/−40.7% torque) @ 24.1 C as run on a Brookfield DV-II+ Viscometer. The chemical composition of the wafer product is 67% protein, 22% carbohydrate, and 6% fat.

EXAMPLE 3

Proteinaceous batter ingredients consisting of 18 parts (18%) instantized whey protein isolate, 12 parts (12%) textured wheat protein, 12 parts (12%) soy protein isolate, 3 parts (3%) lecithin, 1 part (1%) rice bran oil, 0.2 parts Sucralose (artificial sweetener), 0.1 parts—lemon oil, and 53 parts (53%) water were blended in a high speed homogenizing mixer until thoroughly liquefied into a smooth batter-like consistency. The protein batter product was then directly applied to a preheated (310° F.) Teflon coated pizzelle wafer cookie molding plate system. The plates were closed and locked in place, applying direct heat to the 2 mm batter sheet. Steam released through the vents and the product was cooked, under pressure, for 2.5 minutes. Final high protein molded pizzelle wafer cookie was light weight, low moisture (<2%), and possessed a composition of 78% protein, 7% fat, and 4% carbohydrate.

The solids to water mass balance of the batter is 1.00:1.27 and the viscosity of the batter (no added emulsifying agents, fats, sweeteners) was 2000 cP (+/−11.5% torque) @ 23.8° C. as run on a Brookfield DV-II+ Viscometer.

EXAMPLE 4

A batter blend of ingredients consisting of 99 lbs (26%) instantized (lecithin agglomerated) whey protein isolate (@ 92% protein), 40 lbs (10.5%) textured wheat protein (@ 72% protein), 40 lbs wheat flour, 3% lecithin, 1% rice bran oil, 0.2% Sucralose (artificial sweetener), 0.1% vanillin, and 200 lbs (53%) water were blended in a high speed square vessel mixer until thoroughly liquefied/blended into a batter-like consistency. The proteinaceous batter was then pumped through an overhead stainless steel 2 inch pipe system to the wafer machine and wand applied to preheated (~210° F.) Haas stainless steel molded wafer plates. The plates were closed and locked in place, applying direct heat to the 2 mm batter sheet. Steam released through the vents and the product was cooked, under pressure, for 2.0 minutes. Final protein wafer was durable and low moisture (~2% moisture).

The solids to water mass balance of the batter is 1.00:1.12 and the viscosity of the batter (no added emulsifying agents, fats, sweeteners) was 1600 cP (+/−40.7% torque) @ 24.1 C as run on a Brookfield DV-II+ Viscometer. The chemical composition of the wafer product is 67% protein, 22% carbohydrate, and 6% fat.

Wafers were then transferred to a layering system where wafers were then taken individually, and a thin layer of hot protein—fat crème was applied to the top of 3 (three). The crèmed wafers were then assembled a book format—placing one on top of the other, with the last no-crème wafer going on top, creating a wafer-crème-wafer-crème-wafer-crème-wafer product. The product was then allowed to cool, and then cut into four 1.25"×5" layered wafer crème protein bars.

EXAMPLE 5

A batter blend of ingredients consisting of 20 parts wheat flour (26%), 10 parts (13%) whey protein isolate, 2 parts dried egg white powder (2.5%), and 36 parts (46%) water were blended in a high speed mixer until thoroughly liquefied into a batter. The protein batter product was then directly applied to a preheated (350° F.) Heibenstreit stainless steel molded wafer plate. The plates were closed and locked in place, applying direct heat to the 3 mm batter sheet. Steam released through the vents and the product was cooked, under pressure, for 2.5 minutes. Final protein wafer was durable and low moisture.

Final chemical composition of the pressure molded 5"×7" proteinaceous wafer was 38% protein, 3% fat, and 56% carbohydrate.

The solids to water mass balance of the batter is 1.00:1.12 and the viscosity of the batter (no added emulsifying agents, fats, sweeteners) was 660 cP (+/−16.4% torque) @ 24.5° C. as run on a Brookfield DV-II+ Viscometer.

EXAMPLE 6

Proteinaceous batter blend of ingredients consisting of 15 parts (14%) whey protein isolate, 20 parts (19%) wheat flour, 5 parts (5%) composite protein (@ 85% protein), 5 parts (5%) rennet casein, and 60 parts (57%) water were blended in a high speed mixer until thoroughly liquefied into a batter-like consistency. The proteinaceous batter product was then directly applied to a preheated (300° F.) Heibenstreit stainless steel molded wafer plate. The plates were closed and locked in place, applying direct heat to the 3 mm batter sheet. Steam released through the vents and the product was cooked, under pressure, for approx. 2 minutes. Final protein wafer was durable and low moisture (<2%).

The solids to water mass balance of this batter is 1.00:1.33 and the viscosity of the batter (no added emulsifying agents, fats, sweeteners) was 556 cP (+/−13.7% torque) @ 24.1° C. as run on a Brookfield DV-II+ Viscometer.

Final chemical composition of the pressure molded 5"×7" protein wafer was 52% protein, 3% fat, and 40% carbohydrate.

EXAMPLE 7

Proteinaceous batter blend of ingredients consisting of 15 parts (14%) whey protein isolate, 20 parts (19%) wheat flour, 5 parts (5%) composite protein (@ 85% protein), 5 parts (5%) rennet casein, and 60 parts (57%) water were blended in a high speed mixer until thoroughly liquefied into a batter-like consistency. The proteinaceous batter product was then directly applied to a preheated (300° F.) Heibenstreit stainless steel molded wafer plate. The plates were closed and locked in place, applying direct heat to the 3 mm batter sheet. Steam released through the vents and the product was cooked, under pressure, for approx. 2 minutes. Final protein wafer was durable and low moisture (<2%).

The solids to water mass balance of this batter is 1.00:1.33 and the viscosity of the batter (no added emulsifying agents, fats, sweeteners) was 556 cP (+/−13.7% torque) @ 24.1° C. as run on a Brookfield DV-II+ Viscometer.

Final chemical composition of the pressure molded 5"×7" protein wafer was 52% protein, 3% fat, and 40% carbohydrate.

4 (four) of the above described wafers were then placed flat down, individually, and a thin layer of hot vanilla flavored protein crème was applied to the top of 3 (three). The wafers were then assembled in a book format—placing one on top of the other, with the last no-crème wafer going on top, creating a wafer-crème-wafer-crème-wafer-crème-wafer product. The product was then allowed to cool, and then cut into four 1.25"×7" protein bars.

EXAMPLE 8

Proteinaceous ingredients consisting of 25% instantized whey protein isolate, 23% textured wheat protein, 3% lecithin, 1.5% high oleic safflower oil, 0.2% Sucralose (artificial sweetener), 1% nutmeg spice powder, 3% cinnamon spice powder, and 51% water were blended in a high speed mixer until thoroughly liquefied into a batter-like consistency. The protein batter product was then directly applied to a preheated (390° F.) Heibenstreit stainless steel molded wafer plate. The plates were closed and locked in place, applying direct heat to the 5 mm batter sheet. Steam released through the vents and the product was cooked, under pressure, for 3 minutes. Final protein wafer was durable and low moisture (<4%).

The solids to water mass balance of this batter is 1.00:1.03 and the viscosity of the batter was 4900 cP (+/−29.5% torque) @ 24.1° C. as run on a Brookfield DV-II+ Viscometer. Final chemical composition of the pressure molded 5"×7" protein wafer was 78% protein, 8.5% fat, and 7.5% carbohydrate.

EXAMPLE 9

Proteinaceous batter blend of ingredients consisting of 16.6% whey protein isolate, 16.6% dried egg white powder, 16.6% wheat flour, and 50% water were blended in a high speed mixer until thoroughly liquefied into a batter-like consistency. The protein batter product was then directly applied to a preheated (225° F.) Heibenstreit stainless steel molded wafer plate. The plates were closed and locked in place, applying direct heat to the 5 mm batter sheet. Steam released through the vents and the product was cooked, under pressure, for 3-4 minutes. Final protein wafer was durable and low moisture.

The solids to water mass balance of this batter is 1.00:1.00 and the viscosity of the batter (no added emulsifying agents, fats, sweeteners) was 2450 cP (+/−62% torque) @ 25° C. as run on a Brookfield DV-II+ Viscometer.

Final chemical composition of the pressure molded 5"×7" protein wafer product was 60% protein, 3% fat, and 30% carbohydrate.

EXAMPLE 10

Proteinaceous ingredients consisting of 17% wheat flour, 17% rice flour, 9% acid casein, 2% dried egg white powder and 56% water were blended in a high speed mixer until thoroughly liquefied into a batter-like consistency. The protein batter product was then directly applied to a preheated (325° F.) Heibenstreit stainless steel molded wafer plate. The plates were closed and locked in place, applying direct heat to the 5 mm batter sheet. Steam released through the vents and the product was cooked, under pressure, for 2-3 minutes. Final protein wafer was durable and low moisture (<4%).

The solids to water mass balance of this batter is 1.00:1.26 and the viscosity of the batter (no added emulsifying agents, fats, sweeteners) was 1300 cP (+/−10.2% torque) @ 25.6° C. as run on a Brookfield DV-II+ Viscometer.

Final chemical composition of the pressure molded 5"×7" protein wafer was 25% protein, 3% fat, and 64% carbohydrate.

EXAMPLE 11

Proteinaceous batter blend of ingredients consisting of 24% whey protein isolate, 22% textured wheat protein, and 54% water were blended in a high speed mixer until thoroughly liquefied into a batter-like consistency. The protein batter product was then directly applied to a preheated (375° F.) Heibenstreit stainless steel molded wafer plate. The plates were closed and locked in place, applying direct heat to the 5 mm batter sheet. Steam released through the vents and the product was cooked, under pressure, for 3-4 minutes. Final protein wafer was durable and low moisture.

The solids to water mass balance of this batter is 1.00:1.14 and the viscosity of the batter (no added emulsifying agents, fats, sweeteners) was 2600 cP (+/−15.6% torque) @ 23.1° C. as run on a Brookfield DV-II+ Viscometer.

Final chemical composition of the pressure molded 5"×7" protein wafer product was 83% protein, 3% fat, and 10% carbohydrate.

The wafers were then placed into a single arm mixer and thoroughly ground into small pieces (for inclusion in other foods) ranging in size from 1 mm×1 mm to 10 mm×20 mm. The wafer pieces, termed inclusions, were then incorporated into a peanut butter protein crème at a ratio of 1 part wafer:2 parts peanut butter protein crème. The combination product was then thoroughly blended together at a temperature of approximately 40-45° C., followed by molding into a bar utilizing a UHMW polymer mold, chilling the molded bar matrix in a temperature controlled unit to 7° C. for set-up, followed by removing bar slab from mold, cutting slab into 1.25"×6" bars, followed by applying a protein based compound chocolate crème coating.

What is claimed is:

1. A molded proteinaceous food product comprising:
    a proteinaceous batter comprising:
        a wheat protein containing at least 70% protein;
        at least one additional protein; and
        water;
    the proteinaceous batter having a solids to water ratio of from about 1:0.5 to about 1:4;
    wherein the molded proteinaceous food product is made by molding the proteinaceous batter under pressure and at a temperature of greater than 212° F. and less than 500° F., using a heated drum mold that surrounds all sides of the proteinaceous batter.

2. The molded proteinaceous food product of claim 1, comprising at least 50% protein.

3. The molded proteinaceous food product of claim 1, comprising from 75% to 85% protein.

4. The molded proteinaceous food product of claim 1, further comprising at least 4% carbohydrate.

5. The molded proteinaceous food product of claim 1, comprising from 4% to 10% carbohydrate.

6. The molded proteinaceous food product of claim 1, comprising from 25% to 85% protein, from 5% to 10% fat, and from 4% to 10% carbohydrate.

7. The molded proteinaceous food product of claim 1, wherein the batter has greater than 25% solids dry weight protein.

8. The molded proteinaceous food product of claim 1, wherein the proteinaceous batter has greater than 30% solids dry weight protein, and has a viscosity of less than 12,000 centipoise (cP) but greater than 200 cP.

9. The molded proteinaceous food product of claim 1, wherein the at least one additional protein is selected from the group consisting of whey protein isolate, gluten, soy protein isolate, whey protein concentrate, textured vegetable protein, single cell protein, instantized whey protein isolate, instantized whey protein concentrate, milk protein concentrate, milk protein isolate, instantized milk protein isolate, soy protein concentrate, instantized soy protein, hydrolyzed collagen, gelatin, hydrolyzed gelatin, rennet casein, acid casein, egg protein, caseinates, and instantized caseinates.

10. The molded proteinaceous food product of claim 1, wherein the molded proteinaceous food product is made utilizing a heated hinged double-plate mold.

11. The molded proteinaceous food product of claim 1, wherein the proteinaceous batter has a viscosity less than 12,000 centipoise (cP) but greater than 200 cP.

12. The molded proteinaceous food product of claim 1, wherein the proteinaceous batter has a viscosity less than 5,000 cP but greater than 500 cP.

13. The molded proteinaceous food product of claim 1, wherein the molded proteinaceous food product is a wafer, wafer cone, waffle, or cookie.

14. The molded proteinaceous food product of claim 1, wherein the molded proteinaceous food product is a wafer, wafer cone, waffle, or cookie utilized to make one or more products selected from the group of products consisting of flavored wafers, layered wafer bars, enrobed wafer bars, flavored wafer bars, sandwich wafer snacks, proteinaceous inclusion ingredients, fabricated wafer inclusion bars, fabricated wafer cookies, fabricated wafer candies, crème filled wafer products, wafer cone products, wafer confections, wafer cookies, pizzelle wafer cookies, breakfast waffle food, and Chinese fortune cookie-like product.

15. The molded proteinaceous food product of claim 1, wherein the wheat protein comprises textured wheat protein.

16. The molded proteinaceous food product of claim 1, further comprising egg whites.

17. The molded proteinaceous food product of claim 1, wherein the proteinaceous batter has a viscosity of from about 500 cP to about 5,000 cP.

18. A molded proteinaceous food product comprising:
    a proteinaceous batter comprising:
        a wheat protein containing at least 70% protein;
        at least one additional protein; and
        water;

the proteinaceous batter having a solids to water ratio of from about 1:0.5 to about 1:4;

wherein the molded proteinaceous food product is made by molding the proteinaceous batter under pressure and at a temperature of at least 100° F. and less than 500° F., using a mold that surrounds all sides of the proteinaceous batter;

wherein the wheat protein, the at least one additional protein, or a combination thereof are crosslinked or hydrolyzed utilizing chemical and/or enzymatic agents.

19. A molded proteinaceous food product comprising:
a proteinaceous batter comprising:
　a wheat protein containing at least 70% protein;
　at least one additional protein; and
　water;
the proteinaceous batter having a solids to water ratio of from about 1:0.5 to about 1:4;

wherein the molded proteinaceous food product is made by molding the proteinaceous batter under pressure and at a temperature of at least 100° F. and less than 500° F., using a mold that surrounds all sides of the proteinaceous batter;

wherein the wheat protein, the at least one additional protein, or a combination thereof are bridged utilizing chemical and/or enzymatic bridging agents.

20. A molded proteinaceous food product comprising:
a proteinaceous batter comprising:
　a modified wheat protein isolate containing at least 70% protein;
　at least one additional protein; and
　water;
the proteinaceous batter having a solids to water ratio of from about 1:0.5 to about 1:4;

wherein the molded proteinaceous food product is made by molding the proteinaceous batter under pressure and at a temperature of at least 100° F. and less than 500° F., using a mold that surrounds all sides of the proteinaceous batter.

21. The molded proteinaceous food product of claim 1, wherein the wheat protein contains at least 72% protein and is present in the molded proteinaceous food product in an amount of at least 10%.

22. The molded proteinaceous food product of claim 18, wherein the wheat protein contains at least 72% protein and is present in the molded proteinaceous food product in an amount of at least 10%.

23. The molded proteinaceous food product of claim 19, wherein the wheat protein contains at least 72% protein and is present in the molded proteinaceous food product in an amount of at least 10%.

24. The molded proteinaceous food product of claim 20, wherein the modified wheat protein isolate contains at least 72% protein and is present in the molded proteinaceous food product in an amount of at least 10%.

* * * * *